US011179926B2

(12) United States Patent
Deleon et al.

(10) Patent No.: US 11,179,926 B2
(45) Date of Patent: Nov. 23, 2021

(54) HYBRIDIZED LIGHT SOURCES

(71) Applicant: GENERAL ELECTRIC COMPANY, Schenectady, NY (US)

(72) Inventors: Johnny Deleon, Dayton, OH (US); William Murphy, Dayton, OH (US); Stephanie Lynn Depalma, Dayton, OH (US); Brian Peterson, Madeira, OH (US); Travis Sands, Cincinnati, OH (US); Russell Dennison, Glenville, NY (US); Stephen Deak, Liberty Township, OH (US); Kevin Mcevoy, Dayton, OH (US)

(73) Assignee: General Electric Company, Schenectady, NY (US)

( * ) Notice: Subject to any disclaimer, the term of this patent is extended or adjusted under 35 U.S.C. 154(b) by 232 days.

(21) Appl. No.: 15/380,525

(22) Filed: Dec. 15, 2016

(65) Prior Publication Data

US 2018/0169969 A1    Jun. 21, 2018

(51) Int. Cl.
*B33Y 30/00* (2015.01)
*B29C 64/40* (2017.01)
(Continued)

(52) U.S. Cl.
CPC ............ *B33Y 30/00* (2014.12); *B29C 64/135* (2017.08); *B29C 64/40* (2017.08); *B33Y 10/00* (2014.12); *B29K 2105/0058* (2013.01)

(58) Field of Classification Search
CPC ......... B33Y 30/00; B33Y 10/00; B33Y 50/02; B29C 64/40; B29C 64/135; B29C 64/20; B29C 64/10; B29C 64/264; B29C 64/129
See application file for complete search history.

(56) References Cited

U.S. PATENT DOCUMENTS 4,041,476 A    8/1977  Swainson
5,094,935 A *  3/1992  Vassiliou ............... B29C 64/141
                                              264/401
(Continued)

FOREIGN PATENT DOCUMENTS

CN    103522546 A    1/2014
CN    104175559 A    12/2014
(Continued)

OTHER PUBLICATIONS

International Search Report and Written Opinion issued in connection with corresponding PCT Application No. PCT/US2017/063881 dated Apr. 27, 2018.

(Continued)

*Primary Examiner* — Marc C Howell
*Assistant Examiner* — Debjani Roy
(74) *Attorney, Agent, or Firm* — Dority & Manning, P.A.

(57) ABSTRACT

The present disclosure generally relates to additive manufacturing of an object using both a digital light processing (DLP) projector and a focused energy source to irradiate a photopolymerizable material, and apparatuses and methods for the same. The DLP projector irradiates and cures an outer perimeter of the object, and the focused energy source irradiates and cures an inner region of the object. In a preferred embodiment, irradiation by both the DLP projector and the focused energy source occur from underneath a tank holding the photopolymerizable material and through a transparent window.

21 Claims, 7 Drawing Sheets

(51) Int. Cl.
  *B29C 64/135*   (2017.01)
  *B33Y 10/00*    (2015.01)
  *B29K 105/00*   (2006.01)

(56) References Cited

U.S. PATENT DOCUMENTS

| | | |
|---|---|---|
| 5,175,077 A | 12/1992 | Grossa |
| 5,236,326 A | 8/1993 | Grossa |
| 5,236,812 A | 8/1993 | Vassiliou et al. |
| 5,460,758 A * | 10/1995 | Langer ............... G03F 7/0037 |
| | | 264/401 |
| 5,610,824 A | 3/1997 | Vinson et al. |
| 5,764,521 A | 6/1998 | Batchelder et al. |
| 5,866,058 A | 2/1999 | Batchelder et al. |
| 5,900,207 A | 5/1999 | Danforth et al. |
| 5,939,008 A | 8/1999 | Comb et al. |
| 5,968,561 A | 10/1999 | Batchelder et al. |
| 5,980,813 A | 11/1999 | Narang et al. |
| 6,051,179 A | 4/2000 | Hagenau |
| 6,067,480 A | 5/2000 | Stuffle et al. |
| 6,110,411 A | 8/2000 | Clausen et al. |
| 6,200,646 B1 | 3/2001 | Neckers et al. |
| 6,391,245 B1 | 5/2002 | Smith |
| 6,468,891 B2 * | 10/2002 | Williams ............ H01L 21/4857 |
| | | 438/597 |
| 6,500,378 B1 * | 12/2002 | Smith ................... B29C 35/08 |
| | | 264/308 |
| 6,641,897 B2 * | 11/2003 | Gervasi ................ G06T 19/00 |
| | | 264/401 |
| 6,947,058 B1 | 9/2005 | Elmquist |
| 7,045,738 B1 | 5/2006 | Kovacevic et al. |
| 7,084,875 B2 | 8/2006 | Plante |
| 7,158,849 B2 | 1/2007 | Huang et al. |
| 7,164,420 B2 | 1/2007 | Ard |
| 7,555,726 B2 | 6/2009 | Kurtenbach et al. |
| 7,569,174 B2 | 8/2009 | Ruatta et al. |
| 7,614,866 B2 | 11/2009 | Sperry et al. |
| 7,742,060 B2 | 6/2010 | Maillot |
| 7,995,073 B1 | 8/2011 | Shemanarev et al. |
| 8,259,103 B2 | 9/2012 | Glueck et al. |
| 8,269,767 B2 | 9/2012 | Glueck et al. |
| 8,513,562 B2 | 8/2013 | Bichsel |
| 8,522,159 B2 | 8/2013 | Kurtenbach et al. |
| 8,666,142 B2 | 3/2014 | Shkolnik et al. |
| 8,744,184 B2 | 6/2014 | Ameline et al. |
| 8,805,064 B2 | 8/2014 | Ameline et al. |
| 8,873,024 B2 | 10/2014 | Jamar et al. |
| 8,992,816 B2 | 3/2015 | Jonasson et al. |
| 9,153,052 B2 | 10/2015 | Ameline et al. |
| 9,159,155 B2 | 10/2015 | Andersen |
| 9,186,847 B2 | 11/2015 | Fruth et al. |
| 9,205,601 B2 * | 12/2015 | DeSimone ............ G03F 7/0037 |
| 9,221,100 B2 | 12/2015 | Schwarze et al. |
| 9,415,443 B2 | 8/2016 | Ljungblad et al. |
| 10,639,843 B2 | 5/2020 | Yuan et al. |
| 2005/0191016 A1 * | 9/2005 | Ishikawa ............ B23K 26/0604 |
| | | 385/115 |
| 2006/0230984 A1 | 10/2006 | Bredt et al. |
| 2011/0089610 A1 * | 4/2011 | El-Siblani ............... B29C 33/44 |
| | | 264/401 |
| 2011/0101570 A1 * | 5/2011 | John .................... B29C 64/135 |
| | | 264/401 |
| 2013/0008879 A1 | 1/2013 | Bichsel |
| 2014/0099476 A1 | 4/2014 | Subramanian et al. |
| 2014/0200865 A1 | 7/2014 | Lehmann et al. |
| 2014/0348691 A1 | 11/2014 | Ljungblad et al. |
| 2014/0348692 A1 | 11/2014 | Bessac et al. |
| 2015/0086409 A1 | 3/2015 | Hellestam |
| 2015/0102531 A1 | 4/2015 | El-Siblani et al. |
| 2015/0140155 A1 | 5/2015 | Ohno et al. |
| 2015/0158111 A1 | 6/2015 | Schwarze et al. |
| 2015/0165695 A1 | 6/2015 | Chen et al. |
| 2015/0306819 A1 | 10/2015 | Ljungblad |
| 2015/0352668 A1 | 12/2015 | Scott et al. |
| 2016/0067921 A1 | 3/2016 | Willis et al. |
| 2016/0082662 A1 | 3/2016 | Majer |
| 2016/0107383 A1 | 4/2016 | Dikovsky et al. |
| 2016/0137839 A1 | 5/2016 | Rolland et al. |
| 2016/0167160 A1 | 6/2016 | Hellestam |
| 2016/0176114 A1 | 6/2016 | Tsai et al. |
| 2016/0184931 A1 | 6/2016 | Green |
| 2016/0243649 A1 | 8/2016 | Zheng et al. |
| 2017/0326786 A1 * | 11/2017 | Yuan .................... B29C 64/135 |

FOREIGN PATENT DOCUMENTS

| | | | |
|---|---|---|---|
| CN | 105635705 A | 6/2016 | |
| JP | H06-246839 A | 9/1994 | |
| JP | 2016-196098 A | 11/2016 | |
| WO | WO-9600422 A1 * | 1/1996 | ........... B29C 64/129 |
| WO | WO-0100390 * | 6/2000 | ........... B29C 67/00 |
| WO | WO 2006/109355 A1 | 10/2006 | |
| WO | WO 2012/127456 A1 | 9/2012 | |
| WO | WO 2015/153030 A1 | 10/2015 | |
| WO | WO 2016/009426 A1 | 1/2016 | |
| WO | WO 2016/106136 A2 | 8/2016 | |

OTHER PUBLICATIONS

European Search Report Corresponding to Application No. 17881329 dated May 26, 2020.

* cited by examiner

HYBRIDIZED LIGHT SOURCES

The present disclosure generally relates to an apparatus and method for additive manufacturing using multiple light sources, including digital light processing (DLP) projectors in combination with focused energy sources, such as laser beams. The apparatus and method according to the present disclosure can be used to make various objects, including components having strong polymerized inner core portions and well defined outer surfaces, and processes utilizing these components.

BACKGROUND

Additive manufacturing or three-dimensional printing processes are being increasingly used to manufacture structurally complex and intricate objects. Processes such as selective laser melting (SLM), digital light processing (DLP), and stereo lithography (SLA) have been used to produce objects for a variety of industries. DLP uses a projector to project an image onto a photohardenable composition to solidify or cure it. Because DLP uses a projector, it often provides a broad, flood exposure at a range of wavelengths.

U.S. Pat. No. 5,175,077 ("the '077 patent") and U.S. Pat. No. 5,236,326 ("the '326 patent") to DuPont use two exposure elements which may be flood exposure or locally irradiating, on a tank of a photohardenable composition. The exposure elements of the '077 and '326 patents are designed to provide actinic radiations of different wavelengths; the first wavelength is selected to harden the composition, while the second wavelength activates an inhibitor of photohardening. Irradiation at the inhibition wavelength creates an inhibition layer, which serves to un-adhere the photohardened composition.

SUMMARY

In one embodiment, the present disclosure relates to an apparatus for additive manufacturing of an object. The apparatus comprises a tank for holding a photopolymerizable material, the tank comprising a lower surface with a window extending over at least a portion of the lower surface; a digital light processing (DLP) projector for projecting radiation through the transparent window; a focused energy source for irradiating the photopolymerizable material through the transparent window; and a production platform, the production platform adapted to descend to and ascend from the tank. The focused energy source emits radiation between 340 and 420 nm, and the window permits radiation emitted by the DLP projector and the focused energy source to enter the tank. In some aspects, the apparatus further comprises a galvanometer for moving the laser beam over the window in a controlled manner. In some aspects, the focused energy source emits a focused energy beam which follows a path from the focused energy source through the transparent window. In some aspects, the radiation projected by the DLP projector follows a path from the projector through the transparent window. Preferably, the apparatus further comprises one or more mirrors placed along the path of the focused energy beam. Preferably, the apparatus further comprises a digital micromirror device (DMD) placed along the path of the radiation projected by the DLP projector. Preferably, the focused energy source emits radiation between 350 to 400 nm.

In another aspect, the present disclosure relates to a method for additive manufacturing of a desired object, the method including steps (a) to (d). Step (a) involves lowering a production platform into a tank for holding a photopolymerizable material. Step (b) involves projecting light in the shape of at least an outer perimeter of a cross section of the object. Step (c) involves irradiating at least a portion of a cross section of the object using a focused energy source at a wavelength between 340 and 420 nm. Step (d) involves raising the production platform and repeating steps (a) and (b) and/or (c) until the desired object is built. In some aspects, the object is built on the build platform. In some aspects, projecting light and irradiating causes the photopolymerizable material to polymerize. In some aspects, the photopolymerizable material polymerizes onto the build platform. In some aspects, the tank comprises a transparent window that is transparent to the projected light and the irradiation. Preferably, step (b) comprises projecting light from a digital light processing (DLP) projector through the transparent window, and step (c) comprises irradiating through the transparent window. Preferably, the transparent window is located on the bottom of the tank. Preferably, the outer perimeter of the object has a dimensional accuracy of about 0.0001 to about 0.001 inches. Preferably, the step (c) irradiation is carried out in a hatch pattern that defines a hatch area of the cross section of the object. Preferably, the step (b) projecting is carried out to define a projected area of light over the cross section of the object, and the hatch area is less than the projected area in each cross section of the object that is formed using steps (b) and (c).

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details.

The present inventors have found that objects can be manufactured using a combination of direct light processing (DLP) and irradiation of a photopolymerizable material using a focused light source. DLP differs from powder bed and SLM processes in that the light curing of the photopolymerizable material or photohardenable composition occurs through a window at the bottom of a resin tank that projects light upon a build platform that is raised as the process is conducted. According to the present disclosure, DLP is used to cure or polymerize an outer perimeter of a layer of an object to be built, and a focused energy source, such as a laser, is used to cure an inner region of the layer of the object. The perimeter is defined by a mask or pattern defining points to be irradiated and cured by the DLP projector. The mask or pattern may be projected using a digital micromirror device (DMD), exposing a projected area to different energy intensities. Individual pixels of the projected image can be turned on or off at a high frequency. The net result of a pixel's on and off counts determines the irradiated exposure and therefore the amount of cure exhibited by the material.

Further, the polymerization occurs between the underlying window and the last cured layer of the object being built. The underlying window provides support allowing thin filaments of material to be produced without the need for a separate support structure.

Figure 1:
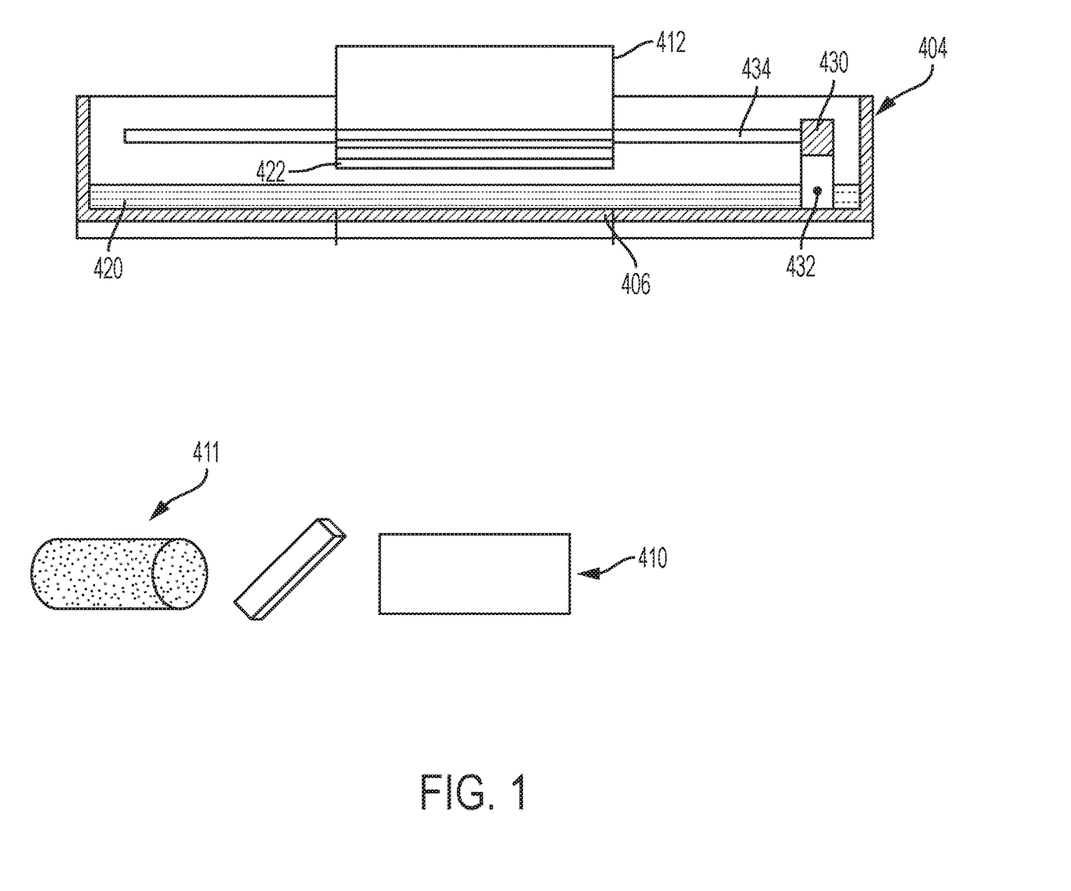
FIGS. 1-5 are schematic diagrams showing an example of an apparatus according to the present disclosure.
Figure 2:
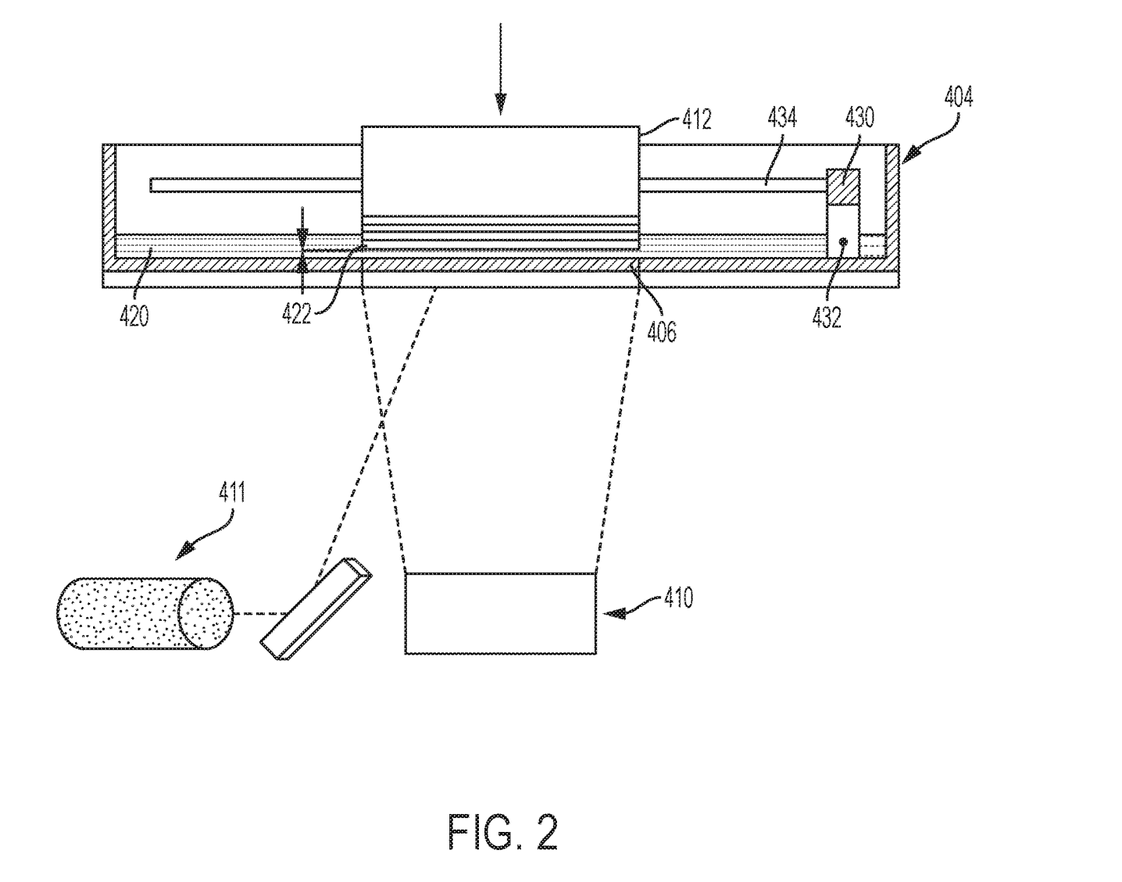
Figure 3:
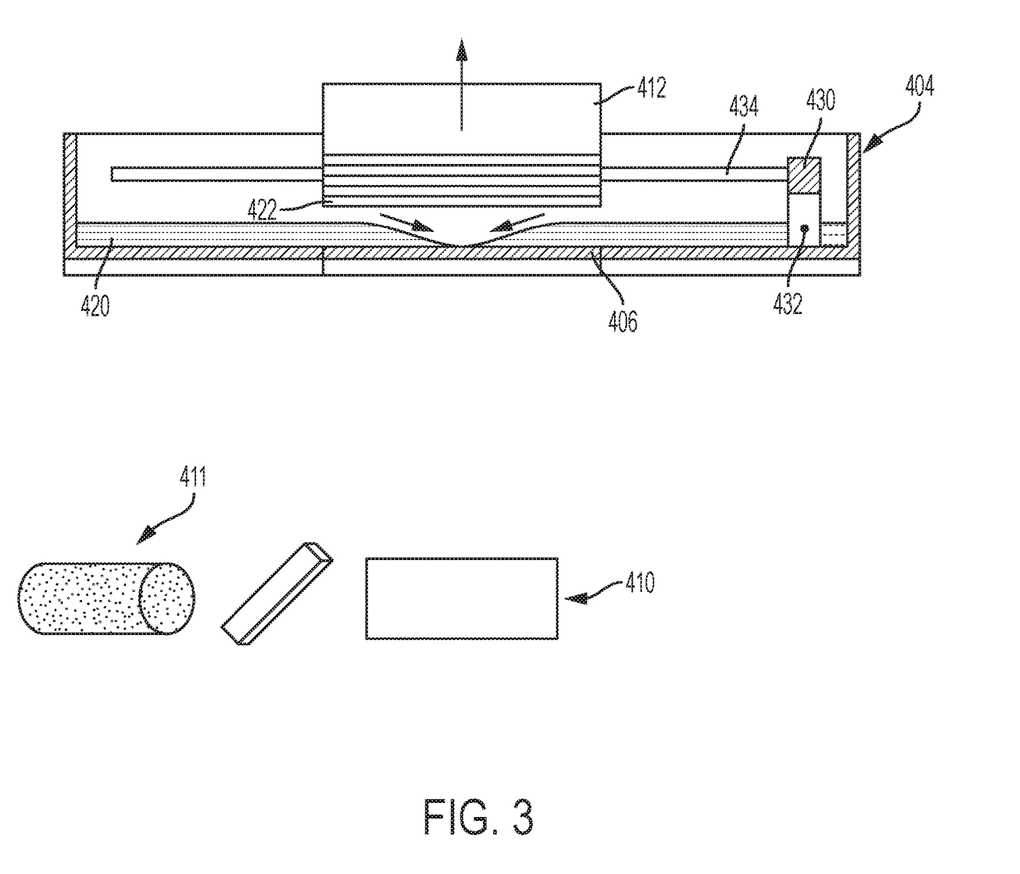

FIGS. 1-3 show schematic diagrams of an apparatus according to the present disclosure.

Opposite the DLP projector 410 and focused energy source 411, a build platform 412 is provided above the tank 404; it is supported by a lifting mechanism (not shown) so that it is held in a height-adjustable way over the tank bottom 406 in the region above the DLP projector or exposure unit 410 (see FIG. 1). The production platform 412 may likewise be transparent or translucent in order that light can be shone in by a further exposure unit above the production platform in such a way that, at least when forming the first layer on the lower side of the production platform 412, it can also be exposed from above so that the layer cured first on the build platform adheres thereto with even greater reliability.

The tank 404 contains a filling of photopolymerizable material 420. The material level of the filling is much higher than the thickness of the layers which are intended to be defined for position-selective exposure. In order to define a layer of photopolymerizable material, the following procedure is adopted. The build platform 412 is lowered by the lifting mechanism in a controlled way so that (before the first exposure step) its lower side is immersed in the filling of photopolymerizable material 420 and approaches the tank bottom 406 to such an extent that precisely the desired layer thickness Δ (see FIG. 2) remains between the lower side of the production platform 412 and the tank bottom 406. During this immersion process, photopolymerizable material is displaced from the gap between the lower side of the production platform 412 and the tank bottom 406. After the layer thickness Δ has been set, the desired position-selective layer exposure is carried out for this layer, in order to cure it in the desired shape. Particularly when forming the first layer, exposure from above may also take place through the transparent or translucent build platform 412, so that reliable and complete curing takes place particularly in the contact region between the lower side of the production platform 412 and the photopolymerizable material, and therefore good adhesion of the first layer to the build platform 412 is ensured. After the layer has been formed, the build platform is raised again by means of the lifting mechanism (see FIG. 3).

These steps are subsequently repeated several times, the distance from the lower side of the layer 422 formed last to the tank bottom 406 respectively being set to the desired layer thickness Δ and the next layer thereupon being cured position-selectively in the desired way.

After the build platform 412 has been raised following an exposure step, there is a material deficit in the exposed region as indicated in FIG. 3. This is because after curing the layer set with the thickness Δ, the material of this layer is cured and raised with the build platform and the part of the shaped body already formed thereon. The photopolymerizable material therefore missing between the lower side of the already formed shaped body part and the tank bottom 406 must be filled from the filling of photopolymerizable material 420 from the region surrounding the exposed region. Owing to the viscosity of the material, however, it does not flow by itself back into the exposed region between the lower side of the shaped body part and the tank bottom, so that material depressions or "holes" can remain here.

Figure 4:
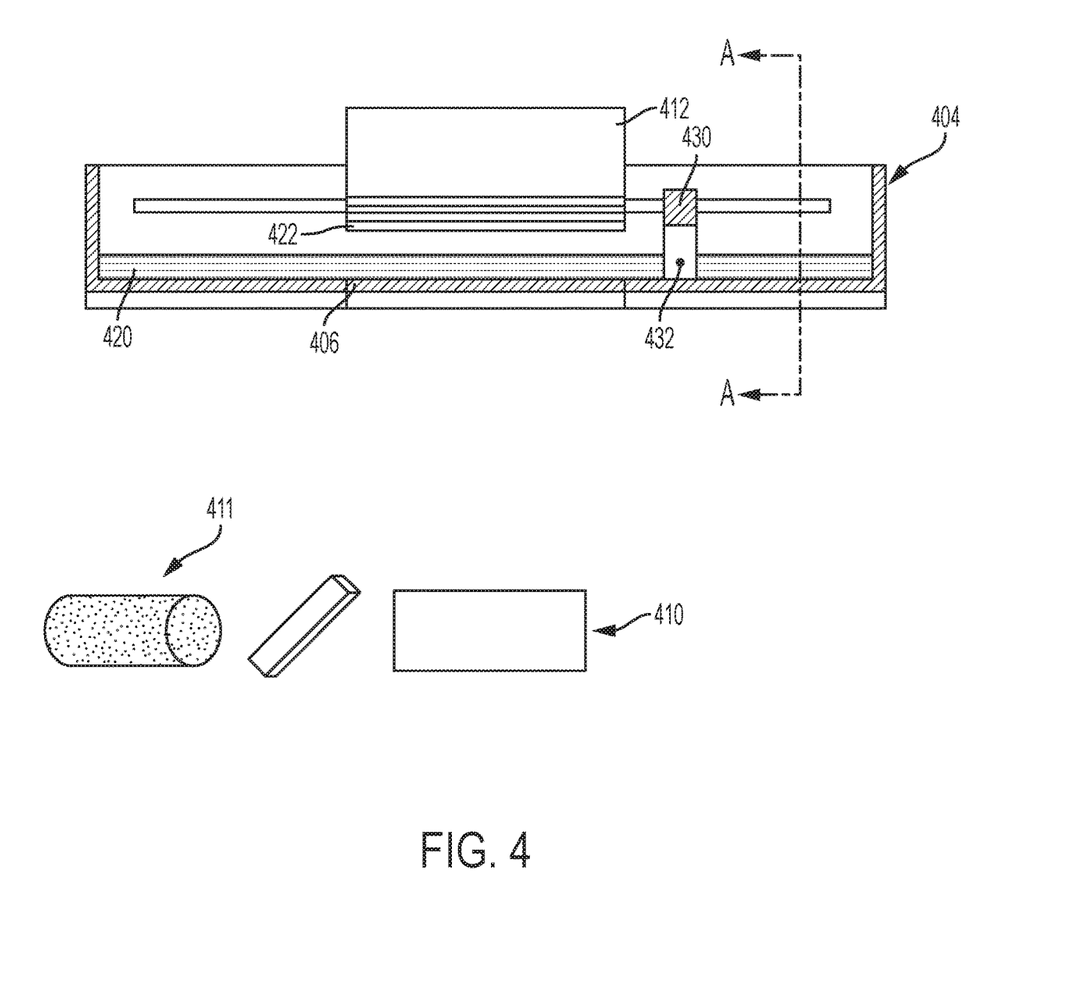

In order to replenish the exposure region with photopolymerizable material, an elongate mixing element 432 is moved through the filling of photopolymerizable material 420 in the tank. In the exemplary embodiment represented in FIGS. 1 to 5, the mixing element 432 comprises an elongate wire which is tensioned between two support arms 430 mounted movably on the side walls of the tank 4. The support arms 430 may be mounted movably in guide slots 434 in the side walls of the tank 404, so that the wire 432 tensioned between the support arms 430 can be moved relative to the tank 404, parallel to the tank bottom 406, by moving the support arms 430 in the guide slots 434. The elongate mixing element 432 has dimensions, and its movement is guided relative to the tank bottom, such that the upper edge of the elongate mixing element 432 remains below the material level of the filling of photopolymerizable material 420 in the tank outside the exposed region. As can be seen in the sectional view of FIG. 5, the mixing element 432 is below the material level in the tank over the entire length of the wire, and only the support arms 430 protrude beyond the material level in the tank. The effect of arranging the elongate mixing element below the material level in the tank 4 is not that the elongate mixing element 432 substantially moves material in front of it during its movement relative to the tank through the exposed region, but rather this material flows over the mixing element 432 while executing a slight upward movement, as indicated by the arrow A in FIG. 4. It has been found that by this type of action on the photopolymerizable material in the tank, it is effectively stimulated to flow back into the material-depleted exposed region between the production platform 412 and the DLP projector or exposure unit 410 and the focused energy source 411.

Figure 5:
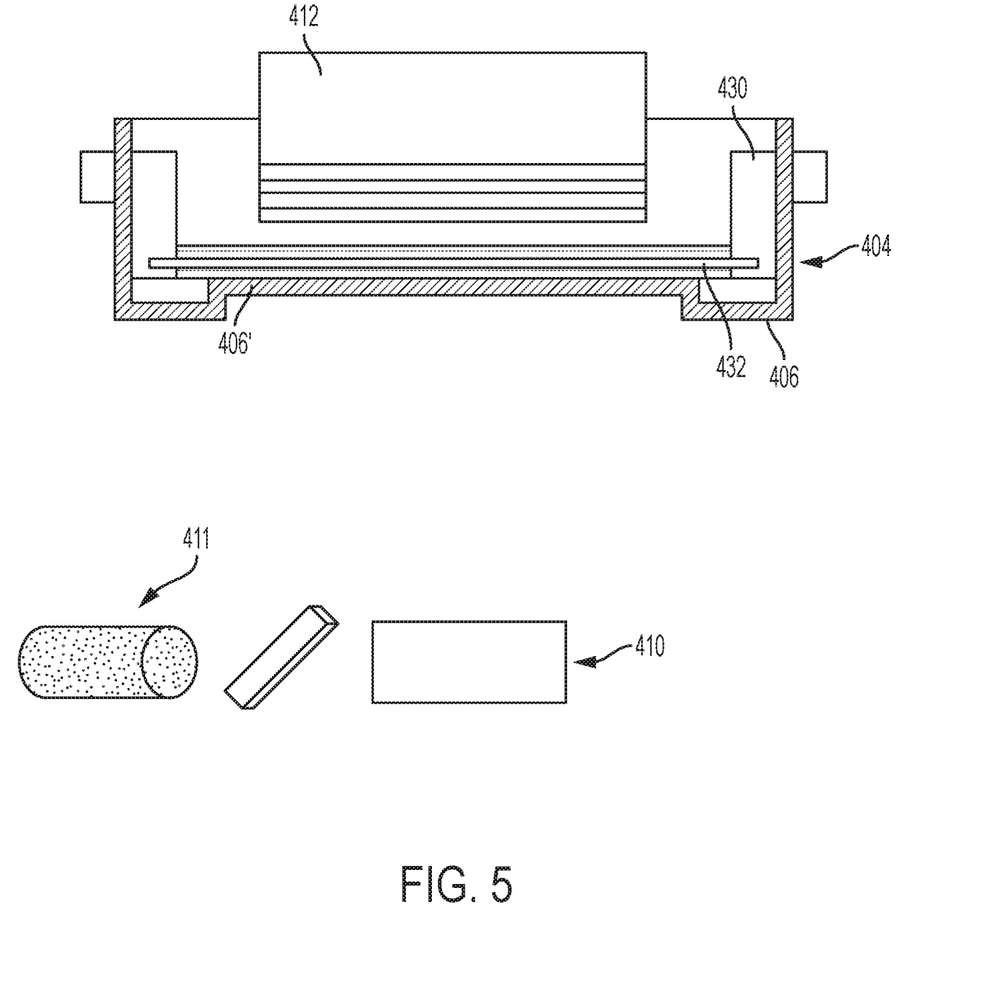

The movement of the elongate mixing element 432 relative to the tank may firstly, with a stationary tank 404, be carried out by a linear drive which moves the support arms 430 along the guide slots 434 in order to achieve the desired movement of the elongate mixing element 432 through the exposed region between the production platform 412 and the exposure unit 410. As shown in FIG. 5, the tank bottom 406 has recesses 406' on both sides. The support arms 430 project with their lower ends into these recesses 406'. This makes it possible for the elongate mixing element 432 to be held at the height of the tank bottom 406, without interfering with the movement of the lower ends of the support arms 430 through the tank bottom 406.

Figure 6:
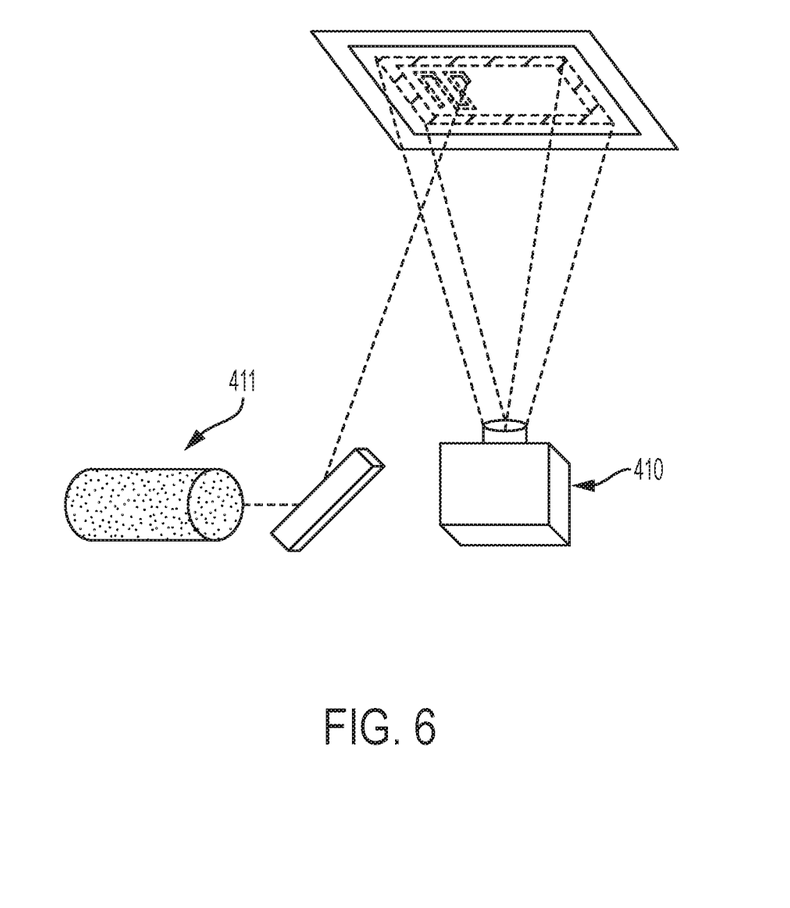
FIG. 6 shows a schematic view of irradiation from underneath a tank in an example of an apparatus according to the present disclosure.
Figure 7:
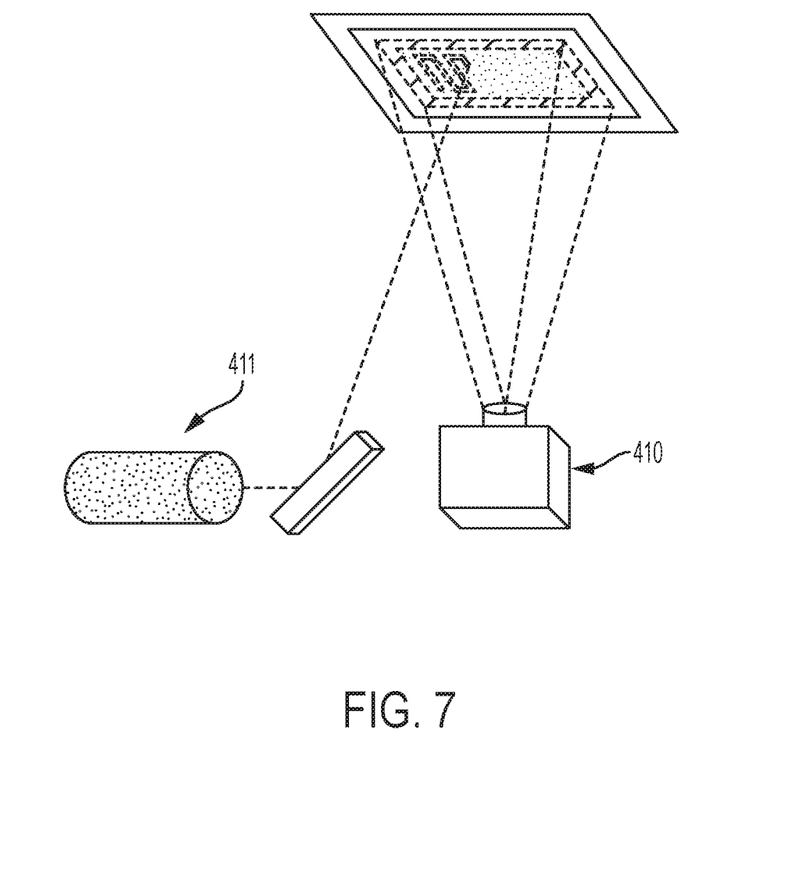
FIG. 7 shows a schematic view of irradiation from underneath a tank in an example of an apparatus according to the present disclosure.

FIG. 6 shows a schematic of a method of manufacturing an object according to the present disclosure. DLP projector 410 and focused energy source 411 irradiate from underneath a tank holding a photopolymerizable material, through a transparent window. The DLP projects an image defining an outer perimeter of the layer of the object to be built. Focused energy source 411, which may be a laser, then irradiates an inner region of the layer of the object to be built. The focused energy beam emitted by the focused energy source may optionally be reflected by one or more mirrors in the path of the focused energy beam from the source to and through the transparent window. The energy emitted by the DLP projector may optionally be modulated by a DMD device in the path of the projected radiation from the DLP projector to and through the transparent window. In another aspect of the present disclosure, the DLP projects an image defining the entire area of the layer of the object to be built, as shown in FIG. 7.

Exposing cross sections using the DLP/laser hatch overlap has the ability to optimize strength of the interior with dimensional accuracy at the surface of the object to be built, which may be a plastic article. For example, in the aspect shown in FIG. 7, wherein the DLP projector 410 projects an image defining the entire area of the layer of the object to be built, the DLP projection may provide an initial polymerization of the photopolymerizable material, at both the outer perimeter of the layer of the object and the inner region of the layer of the object; and subsequent irradiation with focused energy source 411 may provide further polymerization of the photopolymerizable material of the inner region of the layer of the object.

Other alternative methods of DLP may be used to prepare objects according to the present invention. For example, the tank may be positioned on a rotatable platform. When the workpiece is withdrawn from the polymer between successive build steps, the tank may be rotated relative to the platform and light source to provide a fresh layer of polymer in which to dip the build platform for building the successive layers.

In some aspects, the photopolymerizable material may respond to more than one wavelength of energy. In some aspects, the photopolymerizable material has different response characteristics at different wavelengths, such as different depth of penetration or different cured or polymerized properties. In some aspects, the different wavelengths may have separate absorbance bands and may thusly elicit mutually exclusive responses from the photopolymerizable material.

In another aspect, the apparatus according to the present disclosure may comprise multiple projectors, such as multiple DLP projectors, instead of a DLP projector and a focused energy source. In some aspects, the multiple DLP projectors may have different energies. In some aspects, the multiple DLP projectors may have the same energy. In other aspects, the multiple DLP projectors may use different light intensities in a given build layer. In some aspects, the multiple projectors may be used with one or more mirrors in the path of the energy beam emitted.

In some aspects, the energy emitted by the one or more projectors may be modulated using a pixel pattern that is turned on and off at high frequency. Without wishing to be bound by any particular theory, the net on/off count determines the duration and level of exposure of the photopolymerizable material to irradiation, as well as the degree of cure or polymerization of the photopolymerizable material.

This written description uses examples to disclose the invention, including the preferred embodiments, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims. Aspects from the various embodiments described, as well as other known equivalents for each such aspect, can be mixed and matched by one of ordinary skill in the art to construct additional embodiments and techniques in accordance with principles of this application.

The invention claimed is:

1. An apparatus for additive manufacturing of an object, the apparatus comprising:
    a support for a photopolymerizable material, the support having at least a portion which forms a transparent window and defines a build surface;
    a build platform positioned adjacent to the build surface and configured to hold a stacked arrangement of one or more cured layers of the photopolymerizable material;
    a projector for projecting radiation through the transparent window onto the photopolymerizable material at least partially curing the photopolymerizable material within a projected area of a cross section of the object, the projected area defines an outer perimeter of the object; and
    a focused energy source for moving an energy beam along a tool path to form a hatch area of the cross section of the object and irradiating the photopolymerizable material through the transparent window in an inner region within the outer perimeter of the object to at least partially cure the photopolymerizable material within the hatch area of the cross section of the object, wherein the hatch area is less than the projected area in each cross section of the object.

2. The apparatus of claim 1, further comprising a galvanometer for moving the energy beam over the transparent window in a controlled manner along the tool path.

3. The apparatus of claim 1, wherein the focused energy source emits a focused energy beam which follows a path from the focused energy source through the transparent window.

4. The apparatus of claim 3, further comprising one or more mirrors placed along the path of the focused energy beam.

5. The apparatus of claim 1, wherein the radiation projected by the projector follows a path from the projector through the transparent window.

6. The apparatus of claim 5, further comprising a digital micromirror device (DMD) placed along the path of the radiation projected by the projector.

7. The apparatus of claim 1, wherein the energy beam has a wavelength of between 340 and 420 nm.

8. The apparatus of claim 1, wherein the radiation is projected from a DLP projector at a DLP wavelength, the DLP wavelength being different than the wavelength of the energy beam from the focused energy source.

9. The apparatus of claim 1, wherein the projector is a digital light processing (DLP) projector and the focused energy source is a laser.

10. The apparatus of claim 1, wherein the support forms a portion of a tank.

11. A method for additive manufacturing of an object, the method comprising
    (a) moving a build platform to a desired distance from a support having a portion which forms a transparent window and providing a photopolymerizable material between the build platform and the transparent window,
    (b) projecting radiant energy through the transparent window onto the photopolymerizable material in the form of an image defining an outer perimeter of a cross section of the object to define a projected area of light over the cross section of the object and points at both the outer perimeter and an inner region of a layer of the object causing the photopolymerizable material to be at least partially cured by the radiant energy,
    (c) irradiating at least a portion of the cross section of the object in the inner region within the outer perimeter of the object through the transparent window onto the photopolymerizable material in a hatch pattern that defines a hatch area of the cross section of the object using a focused energy source to move an energy beam along a toolpath to form the cross section of object causing the photopolymerizable material to be at least partially cured by the focused energy source, the energy beam having a wavelength between 340 and 420 nm, wherein the hatch area is less than the projected area in each cross section of the object that is formed using steps (b) and (c), and (d) moving the build platform, and-repeating steps (a) and (b) and/or (c) until the object is built.

12. The method of claim 11, wherein the object is built on the build platform.

13. The method of claim 11, wherein projecting the radiant energy and irradiating causes the photopolymerizable material to polymerize.

14. The method of claim 13, wherein the photopolymerizable material polymerizes onto the build platform.

15. The method of claim 11, wherein the transparent window forms a portion of a tank and is transparent to the projected radiant energy and the irradiation.

16. The method of claim 15, wherein step (b) comprises projecting radiant energy from a digital light processing (DLP) projector through the transparent window, and step (c) comprises irradiating through the transparent window with a laser.

17. The method of claim 16, wherein the transparent window is located on a bottom of the tank.

18. The method of claim 11, wherein the outer perimeter of the object has a dimensional accuracy of about 0.0001 to about 0.001 inches.

19. The method of claim 11, wherein the radiant energy projected at step (b) is projected a DLP wavelength, the wavelength being different than the wavelength of the energy beam from the focused energy source.

20. A method for additive manufacturing of an object, the method comprising:
   (a) lowering a build platform into a tank for holding a photopolymerizable material;
   (b) performing a first polymerization of the photopolymerizable material from a projector to define at least a portion of an outer perimeter of a cross section of the object or at least a portion of an inner region of the cross section of the object with the object in a first vertical position;
   (c) performing a second polymerization of the photopolymerizable material on at least a portion of the cross section of the object using a focused energy source having a wavelength of between 340 and 420 nm, wherein the second polymerization at least partially overlaps with the first polymerization, and wherein the second polymerization is within the outer perimeter defined by the first polymerization; and
   (d) raising the build platform to a second position, and repeating steps (a) and (b) and/or (c) until the object is built.

21. The method of claim 20, wherein the outer perimeter of the object has a dimensional accuracy of about 0.0001 to about 0.001 inches.

* * * * *